2,952,512

PRODUCTION OF LITHIUM TETRABORATE FROM LITHIUM HYDROXIDE MONOHYDRATE AND BORIC ACID

Edward C. Cecil, Whittier, and Ernest L. Scott, Trona, Calif., assignors to American Potash & Chemical Corporation, a corporation of Delaware No Drawing. Filed Jan. 16, 1958, Ser. No. 709,425

2 Claims. (Cl. 23—59)

This invention relates in general to the preparation of an anhydrous lithium borate and, more particularly, to the preparation of a lithium borate wherein an anhydrous product is secured without the necessity of handling a liquid at any time during the process, said product being produced from lithium hydroxide and boric acid.

Most processes for the preparation of a lithium borate, such as lithium tetraborate, take place in an aqueous phase with the result that, in the course of the manufacturing process, a crystallization step is necessary in addition to the usual calcining step.

It has now been found that it is possible to prepare anhydrous lithium borate directly without necessitating the handling of liquid ingredients at any point during the process.

It is therefore an object of this invention to provide for the preparation of lithium tetraborate in a substantially dry and powdered form.

A further object of this invention is to provide a simplified process for the preparation of an anhydrous lithium borate, particularly lithium tetraborate, which process yields a granular product having a high bulk density.

It is a further object of the invention to provide for the preparation of anhydrous lithium borate by a process which uses readily available reactants, lithium hydroxide monohydrate and boric acid being preferred.

Additional objects and advantages of the invention, if not specifically set forth, will become apparent during the course of the discussion which follows.

Generally, it has been found that anhydrous lithium borate may be prepared readily by calcining an admixture of lithium hyroxide (preferably the monohydrate) and boric acid. The reaction proceeds as follows:

$$2LiOH \cdot H_2O + 4H_3BO_3 \rightarrow Li_2B_4O_7 + 9H_2O$$

Recycled $Li_2B_4O_7$ is used as a diluent for the $H_2O$ produced and for each pound of $Li_2B_4O_7$ obtained, 0.958 pound of water are produced. The reactants ratio is 2.95 pounds of $H_3BO_4$ per pound of $LiOH \cdot H_2O$.

In the preferred embodiment, the initial stages of the process involve the driving off of large quantities of water from the salt mixture. In addition, the heating step drives off carbon dioxide which may be present in the charge in the form of $Li_2CO_3$. Thus, a dry product is produced directly without the necessity for an intervening crystallization step separate from the calcining step. No necessity arises for the handling of liquids at any time during the process.

More particularly, it has been found that anhydrous lithium tetraborate may be made by a process which involves mixing lithium hydroxide monohydrate and boric acid in the dry state together with a quantity of lithium tetraborate (preferably recycled product) to produce a lithium tetraborate by a method which does not require a crystallization step separate from the calcining step. The lithium tetraborate is a diluent serving to insure that the water released is present in small quantity percentagewise and serves to prevent the mass from becoming too sticky. It is possible to carry out the reaction under essentially anhydrous conditions throughout; that is, there is no liquid phase present at any time during the reaction.

The quantity of recycled dry product mixed with the reactants is adjusted to give an easily handled mixture upon calcination. A suitable range is from 0.5 to 1.5 parts of dry, recycled product per 1.0 part of mixed raw materials. However, quantities in excess of 1.5 parts (as high as 4.0) of dry, recycled product per 1.0 part of mixed raw materials can also be used with some improvement in the handling qualities of the charge, but with reduced production capacity for a given size of calciner.

The mixture of recycled product and reactants is fed into a directly-fired rotary kiln which may have an insulated shell to reduce radiation losses therefrom. The temperature of the reaction mixture is gradually raised to 550–650° C. over a period of five to seven hours. It is generally important to use a low rate of heat input during the first portion of the calcining operation as a large quantity of water is removed from the charge in the calciner during this time, especially where the preferred embodiment of the invention is used (lithium hydroxide monohydrate). A final temperature of 550°–650° C. is generally necessary to insure the removal of any carbon dioxide that may be present in the charge or absorbed during heating. In a direct-fired calciner such as that used here, lithium hydroxide will react with the carbon dioxide in the flue gas to form lithium carbonate. The minimum temperature used therefore must be at least sufficient to decompose this lithium carbonate, generally present in a quantity between about three and five percent. The aforementioned temperature is sufficient to achieve this result. Any lower finishing temperature results in the retention of varying amounts of carbon dioxide in the reaction mixture. Tiny amounts of lithium carbonate are not objectionable and hence the calcining temperature may drop slightly below 550° as long as no more than about 0.2 percent lithium carbonate remains in the product.

As stated above, the heating step is carried out in such a fashion that the temperature is slowly raised to the required minimum. This is essential so that the water produced by the reaction may be driven off as it is generated. It has been found that with rapid heating the water is liberated faster than it is evaporated. As an extreme case, if a mixture of lithium hydroxide monohydrate and boric acid with limited amounts of recycled lithium borate is rapidly heated, a thick syrup is produced. If heating is continued until all the water is evaporated, a solid cake is produced. Between this extreme and the preferred procedure, the heated mass will become doughy or sticky. Doughy or sticky conditions are undesirable as they will result in the production of agglomerates and a nonuniform product, puritywise. It may be said that the rate of heating should be so controlled that the reaction mass will not become excessively sticky and this will depend to a large extent upon the recycle rate chosen. Obviously, if more lithium tetraborate is recycled, there will be less tendency for a sticky mass to be formed as there will be less water present relative to the quantity of salt mixture. However, where smaller quantities of lithium tetraborate are recycled, the percentage of water is greater and this will necessitate slower heating to insure that a sticky mass is not obtained. Thus, it may be said that the invention is not limited to a specific heating period. Rather, heating must be controlled such that the desired temperature is eventually reached, viz the temperature at which virtually all of the lithium carbonate is decomposed and the carbon dioxide driven off. Concurrently, a doughy or sticky mass must not be secured.

In the example set forth below, a desirable balance has been struck between recycling ratio and heating rate.

An example is set forth below for illustrative purposes but is not to be deemed as imposing limitations on the scope of the invention other than as set forth in the appended claims.

*Example 1.*—51.0 parts of LiOH·H$_2$O, containing 0.15 part of Li$_2$CO$_3$ and 1.53 parts of H$_2$O were mixed with 146.1 parts of H$_3$BO$_3$ containing 0.15 part of H$_2$O. This mixture was added to 295.75 parts of dry product from the previous run and the entire batch was thoroughly mixed. The mixture was then calcined over a period of six hours, reaching a final temperature of 550°–600° C., which resulted in the removal of 97.0 parts of H$_2$O and gave 395.7 parts of essentially anhydrous lithium tetraborate. Of this 395.7 parts of anhydrous product, 100.0 parts are removed as the product stream and the remaining 295.7 parts are returned to be mixed with the next batch of reactants.

As can be seen from the foregoing, the process is an exceedingly simple one and makes possible the elimination of a great deal of the equipment ordinarily used in the preparation of lithium borates. There is substantially less handling required than is customary in such processes.

A further advantage of this process is that a granular product is obtained. By contrast, other known processes for making anhydrous lithium borate have as their products very fine powders, substantially all of which will pass through a 100-mesh screen. Because of the granular nature of the lithium tetraborate produced by this invention, the bulk density is much higher than for other forms of lithium tetraborate such as are recovered from aqueous solutions and then calcined. The pour density of the granular lithium tetraborate is about 50 to 60 pounds per cubic foot as compared to 15 to 25 pounds per cubic foot for the material produced from aqueous solution.

It obviously is possible to use anhydrous lithium hydroxide in the process but this requires a separate calcining operation—to produce the anhydrous lithium hydroxide from lithium hydroxide monohydrate. Hence, there is no advantage in proceeding in this fashion. However, the use of anhydrous lithium hydroxide reduces the quantity of water produced and hence the necessity for recycling borate is reduced. Nevertheless, it is preferred to directly employ the lithium hydroxide monohydrate in the process, thus avoiding the dehydration step—the approach suggested above being suitable for handling the water evolved.

It is also possible to employ the general principles of this process to produce lithium metaborate and lithium pentaborate in addition to the lithium tetraborate discussed above. The obtaining of these materials is a matter of modifying the ratio of lithium hydroxide to boric acid in the reaction mixture. Lithium metaborate is produced according to the equation:

and the lithium pentaborate is produced according to the formula:

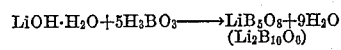

The preferred process is essentially the same as that described earlier, the LiBO$_3$ or the LiB$_5$O$_8$ being recycled for use as a diluent for the water produced.

Where lithium metaborate is desired, 1.086 pound of water are produced per pound of LiBO$_2$ formed, and a quantity of 1.47 pounds of H$_3$BO$_3$ per pound of LiOH·H$_2$O is necessary to satisfy the equation given above.

Where the lithium pentaborate is desired, 0.858 pound of water are produced per pound of LiB$_5$O$_8$ formed. To satisfy the equation given above for the production of lithium pentaborate, 7.37 pounds of H$_3$BO$_3$ per pound of lithium hydroxide monohydrate are necessary.

Hence, it is seen that the invention in its broadest aspect utilizes the general principle of heating lithium hydroxide (preferably the monohydrate) and boric acid with recycled borate product to yield the desired salt. As the above equations illustrate, various salts can be produced by varying the ratio of reactants. In order to get any desired salt in pure form, careful control of the reactant ratio together with good mixing is desired as this avoids the obtaining of salt mixtures. In fact, X-ray analyses indicate that the desired salt is only partially formed and the rest of the product is probably Li$_2$O and B$_2$O$_3$ in the same stoichiometric ratio as the desired salt.

Obviously many modifications and variations of the invention as hereinbefore set forth may be made without departing from the spirit and scope thereof, and therefore only such limitation should be imposed as are indicated in the appended claims.

We claim:
1. A process for the preparation of granular lithium borate comprising: forming an admixture of boric acid, recycled lithium borate and lithium hydroxide monohydrate contaminated with a minor amount of lithium carbonate, each of said materials being substantially dry, said lithium borate being present in a quantity of at least about 0.5 part for each part of said other two ingredients; thereafter slowly raising the temperature of the said admixture over a period of at least about 5 hours to a temperature no greater than about 650° C., said heating step serving to initiate a reaction between said lithium hydroxide monohydrate and said boric acid whereby to produce lithium borate and water, the temperature of said admixture being gradually increased at a rate such that the said water so produced is substantially entirely driven off as it is generated; heating for a time sufficient to decompose substantially all lithium carbonate present and to drive off the carbon dioxide so produced; and allowing the lithium borate product so formed to cool.

2. A process for the production of granular lithium tetraborate comprising: forming an admixture of boric acid, recycled lithium tetraborate and lithium hydroxide monohydrate contaminated with a minor amount of lithium carbonate, each of said materials being substantially dry, said lithium tetraborate being present in a quantity of between about 0.5 and about 1.5 parts for each part of said other two ingredients; thereafter slowly raising the temperature of the said admixture over a period of between about 5 and 7 hours to between about 550° C. and about 650° C. whereby to initiate a reaction between said lithium hydroxide monohydrate and said boric acid to produce lithium tetraborate and water, said raising of said temperature being carried out at a rate such that said water so formed is substantially entirely driven off as it is generated; heating for a time sufficient to decompose substantially all of said lithium carbonate present and thereafter drive off the carbon dioxide so formed; and allowing the lithium tetraborate product so produced to cool.

References Cited in the file of this patent
UNITED STATES PATENTS

| 1,661,203 | Toniolo | Mar. 6, 1928 |
| 1,886,580 | Pierce | Nov. 8, 1932 |
| 2,375,898 | Bruijn et al. | May 15, 1945 |

OTHER REFERENCES

Mellor: "A Comprehensive Treatise on Inorganic and Theoretical Chemistry," vol. 5, pp. 65–66, Longmans, Green and Co. (1924).